United States Patent
Hjorth

Patent Number: 5,482,502
Date of Patent: Jan. 9, 1996

[54] FLAT FISH FILLETING MACHINE

[75] Inventor: Jens Hjorth, Seattle, Wash.

[73] Assignee: Royal Seafoods, Inc., Seattle, Wash.

[21] Appl. No.: 233,595

[22] Filed: Apr. 25, 1994

[51] Int. Cl.[6] .................................................. A22C 25/16
[52] U.S. Cl. ............................................................ 452/162
[58] Field of Search ..................................... 452/161, 162

[56] References Cited

U.S. PATENT DOCUMENTS

| | | | |
|---|---|---|---|
| 1,975,018 | 9/1934 | Palmer | 17/3 |
| 2,210,234 | 8/1940 | Durand | 17/4 |
| 2,502,175 | 3/1950 | Savrda | 17/4 |
| 2,576,301 | 11/1951 | Kuther | 17/4 |
| 2,714,221 | 8/1955 | Gradoff et al. | 452/161 |
| 2,835,918 | 5/1958 | Schlichting | 17/4 |
| 2,920,343 | 1/1960 | Bartels et al. | 17/45 |
| 3,077,632 | 2/1963 | Brandes et al. | 17/45 |
| 3,187,375 | 6/1965 | Williamson et al. | 17/3 |
| 3,510,910 | 5/1970 | Erkins | 17/52 |
| 3,793,675 | 2/1974 | Hogan et al. | 17/59 |
| 3,816,876 | 6/1974 | Barrette, Jr. et al. | 17/57 |
| 3,919,741 | 11/1975 | Backhaus et al. | 17/63 |
| 3,964,132 | 6/1976 | Backhaus et al. | 452/162 |
| 4,025,988 | 5/1977 | Hartmann et al. | 17/52 |
| 4,050,118 | 9/1977 | Wenzel | 17/54 |
| 4,084,293 | 4/1978 | Hogan et al. | 17/52 |
| 4,291,435 | 9/1981 | Hartmann | 17/45 |
| 4,463,478 | 8/1984 | Hartmann et al. | 17/63 |
| 4,476,610 | 10/1984 | Wenzel | 17/55 |
| 4,534,085 | 8/1985 | Stewart | 452/161 |
| 4,551,885 | 11/1985 | Molnar | 17/59 |
| 4,557,019 | 12/1985 | Van Devanter et al. | 17/52 |
| 4,635,318 | 1/1987 | Braeger et al. | 17/63 |
| 4,649,603 | 3/1987 | Bartels | 17/54 |
| 4,715,092 | 12/1987 | Lerner et al. | 17/52 |
| 4,726,094 | 2/1988 | Braeger | 17/54 |
| 4,738,004 | 4/1988 | Lapeyre | 17/52 |
| 4,748,723 | 6/1988 | Braeger et al. | 17/54 |
| 4,756,058 | 7/1988 | Göllnitz et al. | 17/54 |
| 4,800,626 | 1/1989 | Wastell | 17/63 |
| 4,868,951 | 9/1989 | Akesson et al. | 17/54 |
| 4,875,254 | 10/1989 | Rudy et al. | 17/61 |
| 4,899,422 | 2/1990 | King | 17/54 |
| 4,956,894 | 9/1990 | Matsubayashi | 17/58 |
| 4,993,116 | 2/1991 | Urushibara et al. | 452/116 |
| 5,061,221 | 10/1991 | Holzhüter et al. | 452/184 |
| 5,088,958 | 2/1992 | Evers et al. | 452/161 |
| 5,192,243 | 3/1993 | Weustink | 452/157 |
| 5,259,810 | 11/1993 | Evers et al. | 452/149 |

FOREIGN PATENT DOCUMENTS

| | | |
|---|---|---|
| 454839 | 3/1949 | Canada. |
| 1133752 | 4/1957 | France. |
| 0139383 | 1/1980 | Germany. |
| 214058 | 10/1984 | Germany. |
| 621956 | 8/1978 | U.S.S.R. . |
| 1376624 | 12/1974 | United Kingdom. |

*Primary Examiner*—Willis Little
*Attorney, Agent, or Firm*—Christensen, O'Connor, Johnson & Kindness

[57] ABSTRACT

A machine for filleting flat fish. The machine includes two pairs of filleting knives that remove the majority of the fillets from the bones of the fish. The partially filleted flat fish then passes through a second set of knives that cooperate in order to cut the fillets away from the backbone of the flat fish. The flat fish is positively pushed and/or pulled through both sets of knives by a series of drive belts and drive gears that engage and push or pull the flat fish through the filleting machine. At least one of the second set of blades moves in and out with respect to the backbone of the flat fish in response to the thickness of the backbone. The resulting flat fish fillets are fed onto a conveyor that may transport the fillets to additional processing equipment.

7 Claims, 6 Drawing Sheets

FLAT FISH FILLETING MACHINE

FIELD OF THE INVENTION

The present invention relates to fish processing equipment, more specifically, to equipment designed to fillet flat fish, such as sole.

BACKGROUND OF THE INVENTION

Commercial fishermen catch and process tons of fish a day. Many fishermen have complex, highly automated processing equipment that dresses the fish and produces numerous different commercial products for commercial retailers, such as restaurant chains or grocery stores. Such equipment is highly specialized to perform a specific task, such as cutting the heads and tails off, filleting, deboning and skinning, etc. One of the reasons such equipment must be tailored to specific tasks is the large variety of shapes and sizes of fish processed, including pollock, salmon, trout, sole, cod, etc.

To reduce overall processing costs and to improve quality, some commercial fishing vessels include processing equipment and freezers located directly on the ships. As the fish are caught, they are immediately processed and frozen, substantially improving the quality of the final product. This also allows the vessels to remain at sea for long periods of time without transporting the fish to a shore-based processing facility. Most of the processing equipment is large, complex, and expensive. It is difficult and expensive to remove the processing equipment from the vessel and replace it with new processing equipment.

Because of the expense associated with exchanging the processing equipment, including vessel down time, most commercial processing ships are intended to catch and process specific types of fish. As an example, the vessel may be fitted with processing equipment designed to process generally oval fish having a relatively thick cross section, such as pollock or salmon, or generally flat fish having a relatively thin cross section, such as sole. Due to the natural migration of fish, and various fishing laws, individual types of fish are caught and processed during limited times of the year. Therefore, vessels having equipment capable of processing only one type of fish sit idle during long periods of the year. If the processing equipment were available to process flat fish, such as sole, the vessels could be operated over a larger part of the year. This would, in turn, reduce the amount of down time and associated expense for the vessels.

One manufacturer of fish processing equipment is Baader GmbH & Co. KG, Lubeck, Germany ("Baader"). One of the many fish processing machines produced by Baader is the Baader 182. The Baader 182 is designed to process pollock and salmon-shaped fish and includes a conveyor having a plurality of fish holders mounted along the length of the conveyor. Each fish holder includes a recess configured to receive a pollock. While the processor is operating, a worker removes fish from a fish hopper located next to the conveyor and places an individual pollock in the recess of each fish holder. The conveyor subsequently moves the fish holders and pollock along the length of the conveyor into contact with rotating blades that cut both the head and the tail of the pollock off. The body of the pollock is then carried to additional equipment that cuts the pollock into fillets and removes the bones and skin.

The Baader 182 works well with fish having an oval cross section, such as pollock, but does not allow other types of fish to be processed. The Baader 182 is particularly unsuitable for processing fish with a relative flat cross section, such as sole. The fish holders used on the Baader 182 are not capable of holding such fish during processing. Nor can the Baader 182 remove the dorsal and anal fins of a flat fish.

Another of the many fish processing machines produced by Baader is the Baader 175 heading and filleting machine. The filleting section on the Baader 175 is designed to process flat fish, however, it does so at a slow rate that is not economically advantageous on modern processing ships which must process a large amount of fish in a short period of time to remain profitable. In addition, the filleting section on the Baader 175 has a difficult time processing flat fish having a relatively cross section, such as sole. Processing sole with the Baader 175 tends to result in a filleted fish that still includes portions of the backbone in the fish fillets produced by the machine, thus resulting in an unacceptable product. The Baader 175 is also prone to flat fish getting jammed in the fillet section. When jams occur, the entire machine must be shut down and disassembled to locate and correct the problem.

One goal of the present invention is to provide an apparatus and method to fillet flat fish at an increased line speed such that a large number of fish may be processed in a short period of time, thus increasing the profitability of the processing ship on which the equipment is used. Another goal of the present invention is to fillet a flat fish, such as sole, in a manner that removes the bones of the fish including substantially all of the backbone, thus producing a more acceptable commercial product.

SUMMARY OF THE INVENTION

The present invention is a machine for cutting the body of a flat fish into fillets. In one embodiment of the invention, a plurality of knives are used to fillet the flat fish. Means for positively engaging both sides of the flat fish and for positively moving the flat fish through the knives are also included.

According to other aspects of the invention, one or more rotating belts, including means to contact and move the flat fish along the belt, may be used. The rotating belts move in and out with respect to the flat fish in response to the thickness of the flat fish being filleted. Each belt includes a plurality of spikes that extend outwardly from the surface of the belt and penetrate the flat fish in order to move it through the filleting knives.

In accordance with still other aspects of the invention, the knives include a pair of filleting knives and a pair of deboning knives. At least one of the deboning knives moves in and out in response to the thickness of the backbone of the flat fish being filleted. The deboning knives include of a pair of drive knives, each of which has a plurality of teeth and a pair of cutting knives. The cutting knives intermesh with and cooperate with the drive knives to remove the backbone of the flat fish being filleted.

In accordance with a method of the present invention, a flat fish is filleted by contacting and engaging both sides of the body of the flat fish with means for positively moving the body of the flat fish through the filleting machines. The body of the flat fish is moved through a first set of filleting knives that cut along both sides of the bones of the flat fish to partially remove the fillets from the bones. The body of the partially filleted flat fish is then moved through a second set of knives that cut the fillets away from the backbone of the flat fish.

In accordance with other aspects of the method, at least one of the second set of knives moves in and out with respect to the body of the flat fish in response to changes in the thickness of the backbone. In one embodiment, the body of the flat fish is moved through the filleting machine using rotating belts having spikes that engage both sides of the flat fish. The rotating belts move in and out with respect to the body of the flat fish in response to thickness changes in the body of the flat fish.

The present invention ensures that the flat fish moves through the entire filleting machine without jamming by using means to engage both sides of the flat fish and positively move the flat fish through the filleting machine. In the preferred embodiment, the rotating belts have spikes that engage both surface of the flat fish and move it through the filleting and deboning knives. The present invention is capable of filleting flat fish at an increased speed due to the positive movement of the flat fish through the filleting machine.

The present invention also produces a higher quality fillet having less bone fragments than prior processing equipment. At least one of the deboning knives moves in and out to follow thickness variations in the backbone to ensure that the backbone is removed from the fillets while maintaining a greater quantity of meat on the fillets. The drive belts also move in and out in response to thickness changes in the body of the flat fish in order to help prevent any damage to the fish fillets.

The ability of the present invention to fillet flat fish at a greater speed and to produce higher quality fillets with less waste allows flat fish to be filleted more economically.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
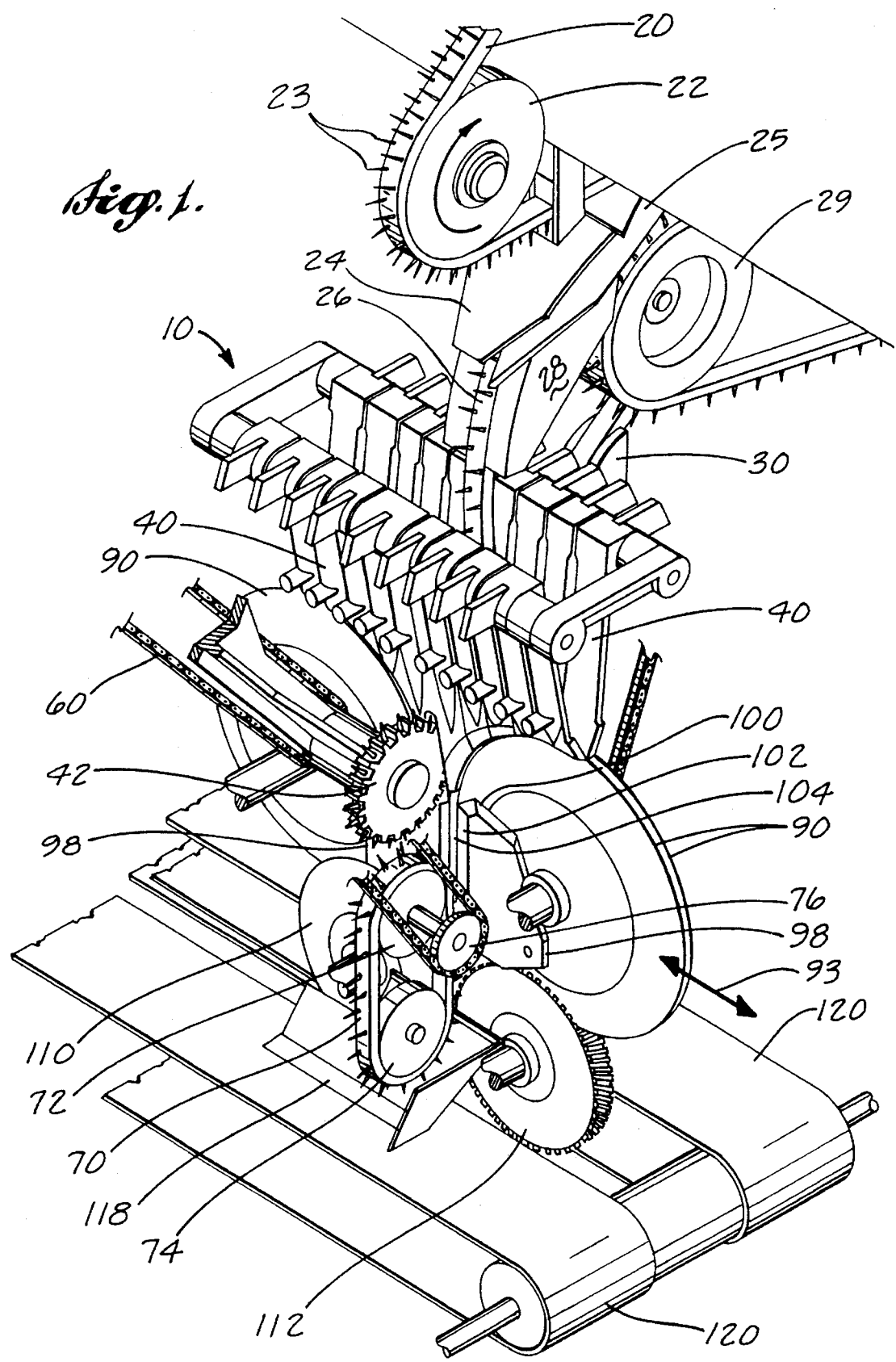
FIG. 1 is a perspective view of a preferred embodiment of a fish filleting machine of the invention illustrating the components that fillet the flat fish.

A preferred embodiment of a flat fish filleting machine 10 according to the invention is illustrated in FIG. 1. The filleting machine 10 is intended to fillet flat fish after the head, tail and fins of the flat fish have been removed by processing equipment, such as the processing equipment described in applicant's U.S. patent application Ser. No. 08/097,966 filed Jul. 27, 1993.

A flat fish (not shown) is provided to the filleting machine 10 by an upper feed belt 20 that forms a part of the flat fish processing machine that removes the head, tail and fins of the flat fish. The upper feed belt 20 is driven clockwise around a pulley 22 as shown by arrow 31. The upper feed belt 20 includes a plurality of spikes 23 that extend outwardly from the outer surface of the upper feed belt. The spikes 23 extend into a flat fish and move the flat fish (from right to left as shown in FIG. 1) through the flat fish processing machine and then direct the flat fish into the top of the flat fish filleting machine 10 through upper and lower guide plates 24 and 25.

Figure 2:
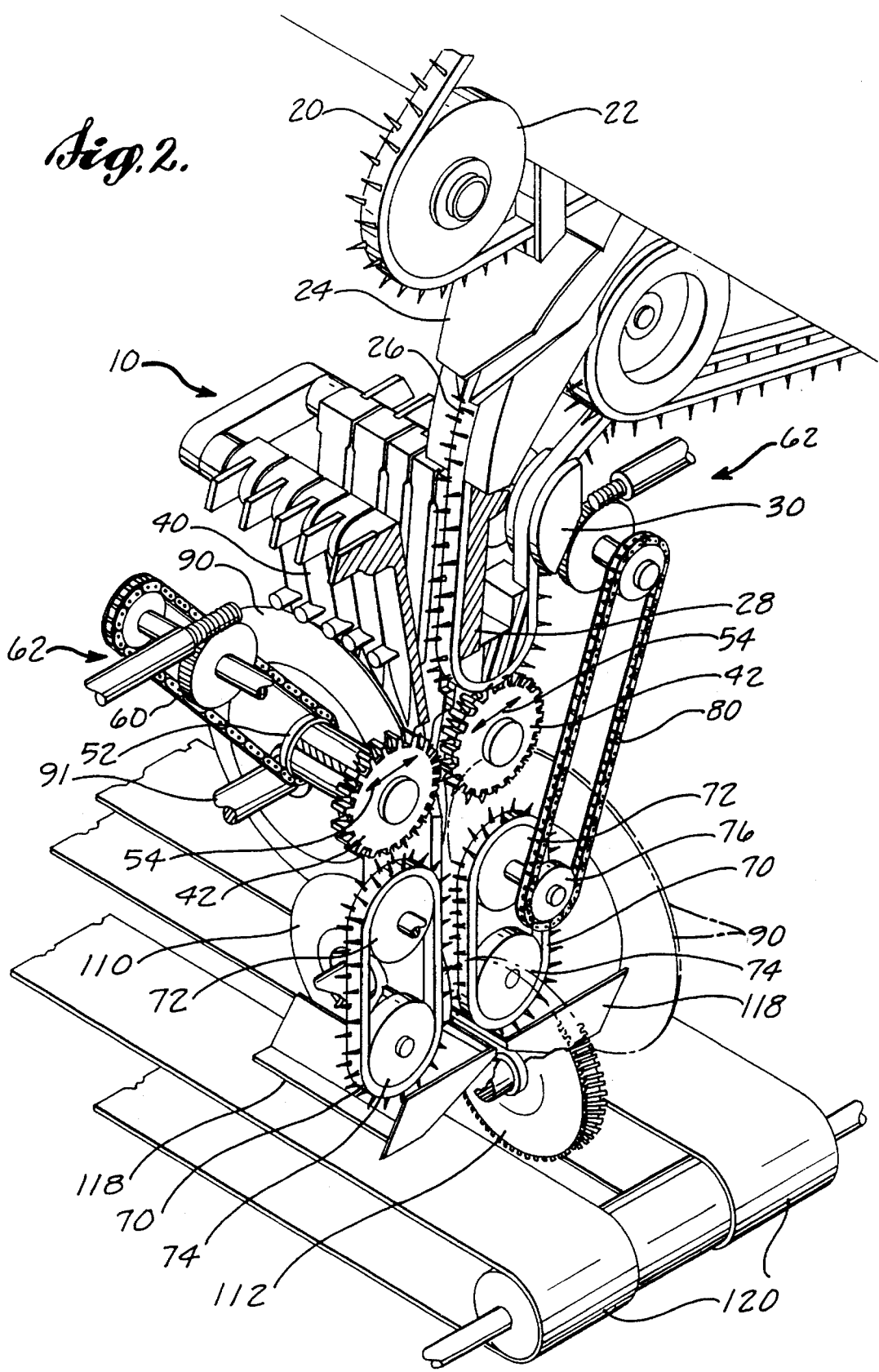
FIG. 2 is a partial cutaway view of the filleting machine shown in FIG. 1 further illustrating the interaction of the components.
Figure 3:
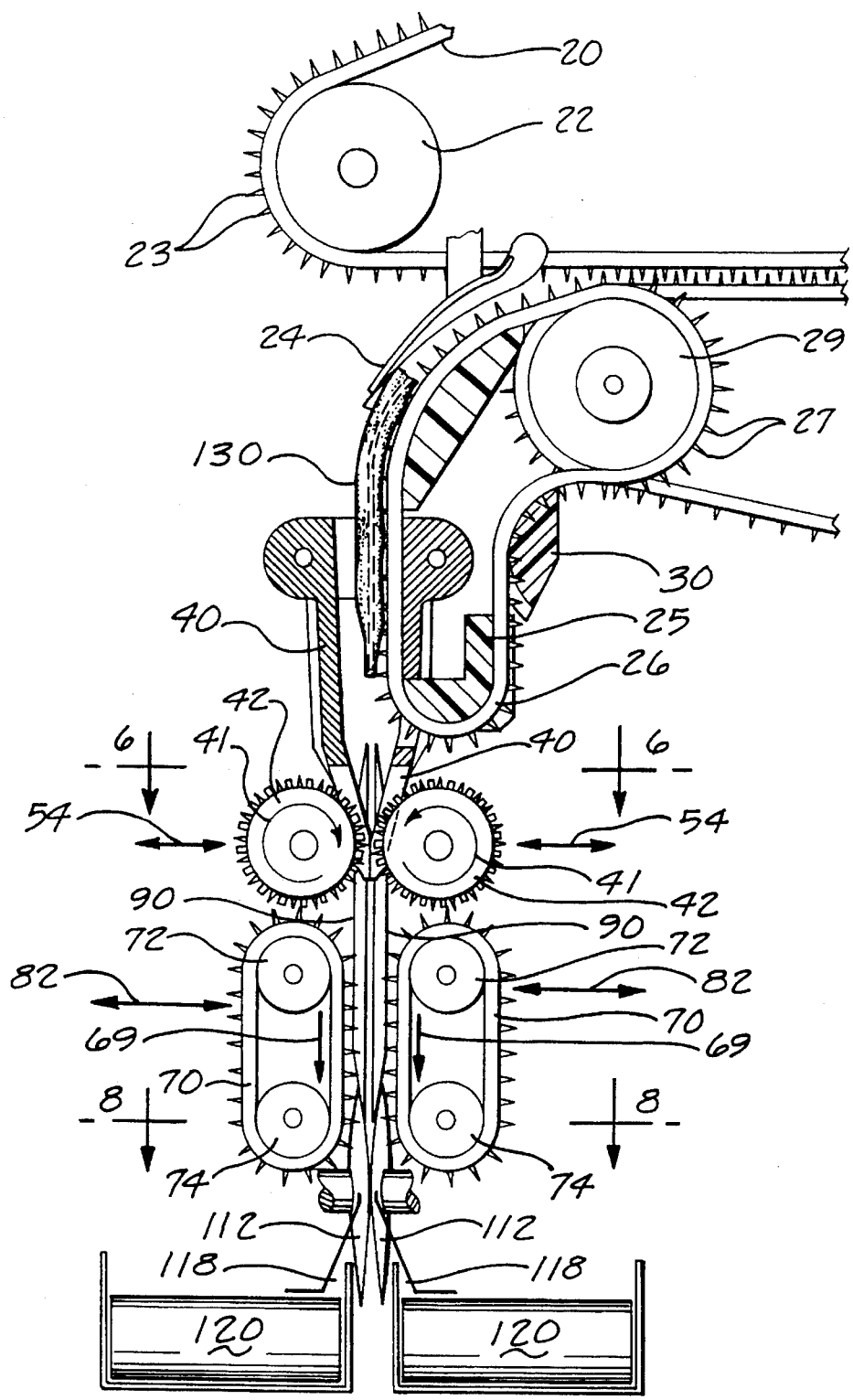
FIG. 3 is a side cross-sectional view of the filleting machine shown in FIG. 1.

The upper and lower guide plates 24 and 25 curve downwardly into the top of the filleting machine 10 from right to left, as best seen in FIGS. 1 and 3 to direct the flat fish 130 (FIG. 3) into the filleting machine. As the flat fish moves into the upper and lower guide plates 24 and 25 (FIGS. 1–3), the flat fish is engaged and moved through the upper and lower guide plates by a lower feed belt 26. The lower feed belt 26 includes a plurality of spikes 27 (FIG. 3) located over the length of the lower feed belt and extending outwardly from the outer surface of the lower feed belt. The lower feed belt 26 extends around a drive pulley 29 (FIG. 3) at its upper end and then extends over a series of bearing surfaces 28 that direct the lower feed belt 26 generally downwardly from the drive pulley 29 down through at least part of the height of a series of centering fingers 40 (described in more detail below) and then upwardly around the drive pulley. The spikes 27 on the lower feed belt 26 extend into the flat fish 130 and positively engage and move the flat fish down through the upper and lower guide plates 24 and 25 and into the centering fingers 40 (FIGS. 1–3).

Figure 4:
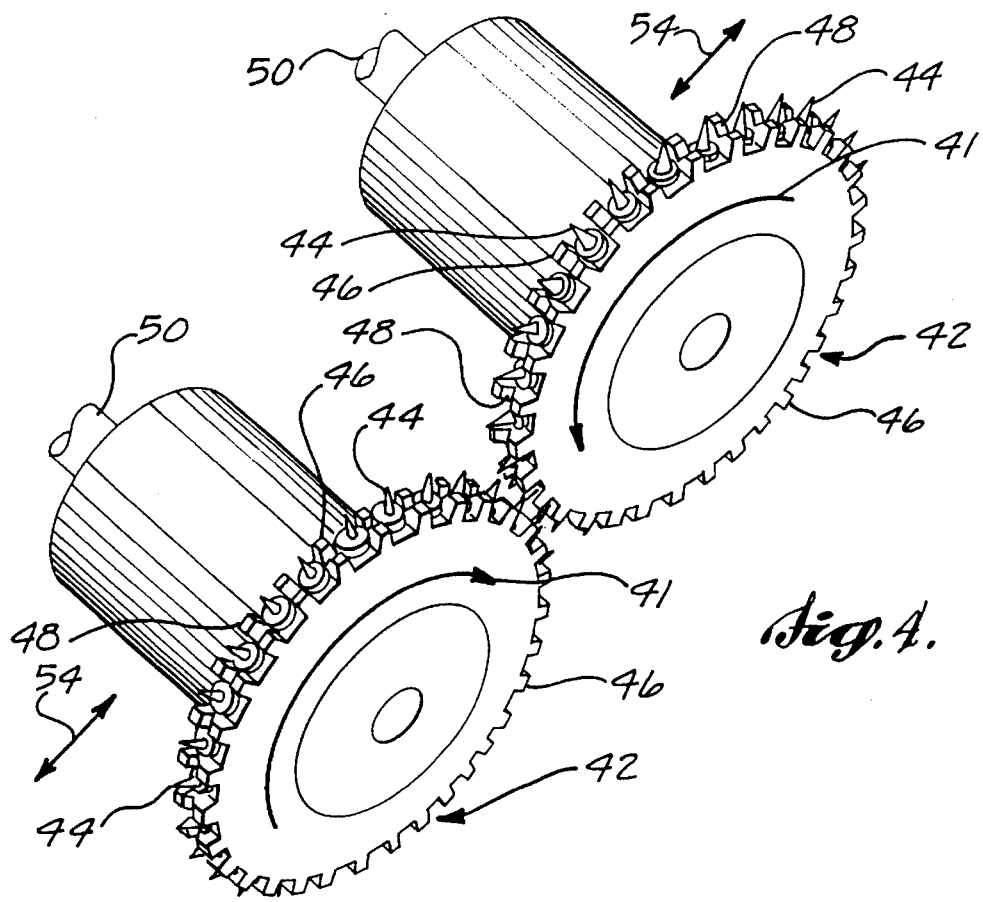
FIG. 4 is an enlarged perspective view of the feed gears of the filleting machine of FIG. 1.

As the flat fish 130 moves downwardly through the fingers 140, and before it disengages from the lower belt 26, spikes 44 (FIG. 4) on two opposing rotatably mounted feed gears 42 (FIGS. 1–3) engage and penetrate opposite sides of the flat fish 130. The feed gears 42 push the flat fish 130 downwardly into a series of knives that fillet the flat fish. In the preferred embodiment, the knives include two opposing pairs of disk-shaped filleting knives 90 (FIG. 1) and a pair of disk-shaped cutting knives 110 and disk-shaped drive knives 112. As the flat fish 130 is pushed downwardly through the filleting knives 90, the filleting knives cut along opposing surfaces of the flat fish's bones 150 (FIG. 8) to remove the majority of the fillets 140 from the bones 150 as described in more detail below.

As the flat fish 130 is pushed downwardly through the filleting machine 10, and before it disengages from the feed gears 42, spikes 68 located around the periphery of two opposing, rotatably mounted bottom belts 70 engage and penetrate the opposite sides of the flat fish 130. The bottom belts 70 move the flat fish 130 through the filleting knives 90 and then move the resulting partially fillet flat fish downwardly through a pair of cutting knives 110 and drive knives 112 (FIGS. 1–3). The cutting knives 110 and drive knives 112 work in cooperation to cut along the backbone 152 (FIG. 9) of the flat fish to cut the portion of the fillets 140 still connected to the backbone 152 off, thus producing two discrete flat fish fillets, as described in detail below. After emerging from the cutting knives 110 and drive knives 112, the resulting individual flat fish fillets are gravity fed along opposing guides 118 onto two conveyors 120 that convey the individual fillets to further processing equipment, such as a skinner.

Figure 6:
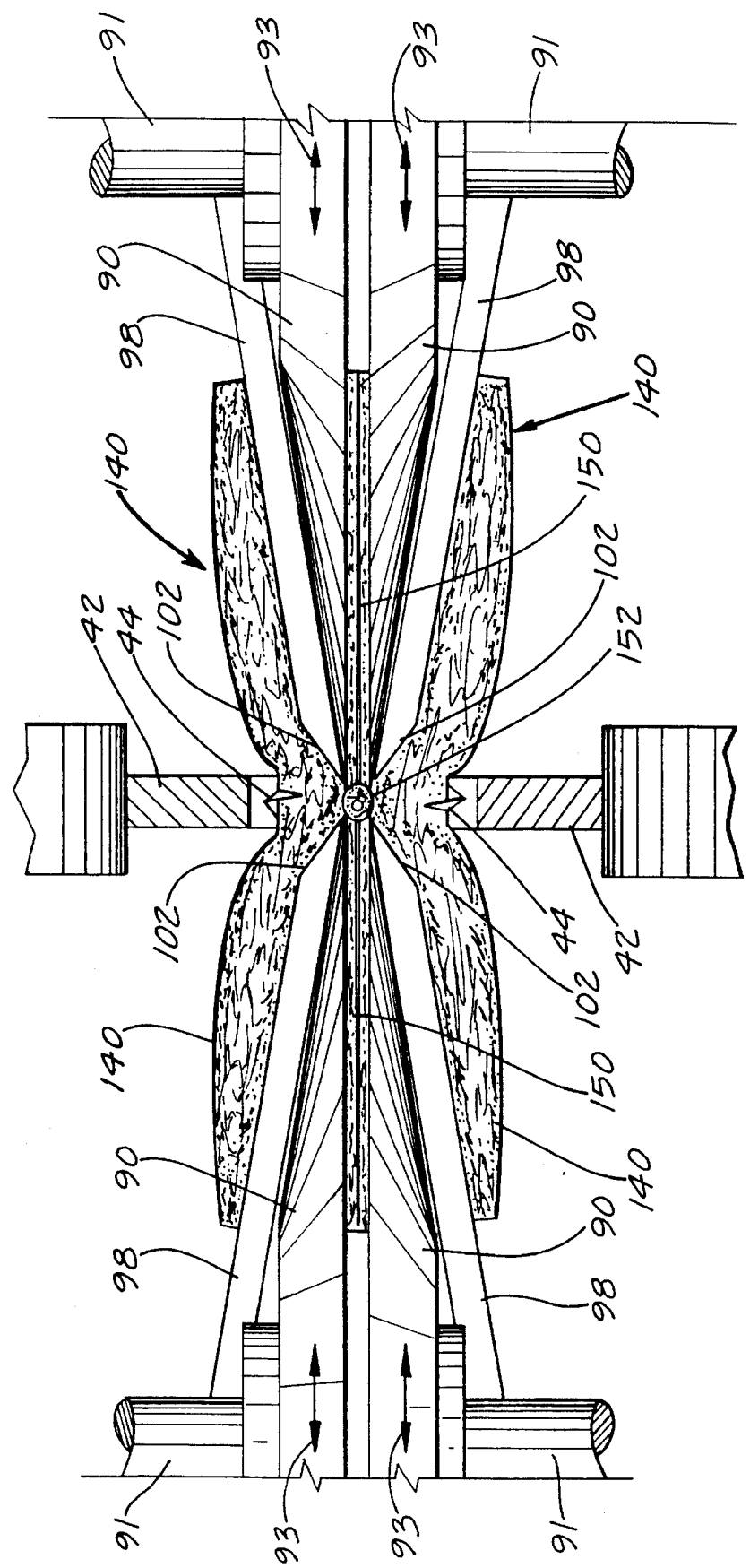
FIG. 6 is a partial cutaway top view of the filleting knives and feed gears as a flat fish is filleted.

The operation and components of the present invention will now be described in more detail by reference to FIGS. 1–3. As the flat fish 130 moves through the guide plates 24 and 25, it moves into a plurality of centering fingers 40. The centering fingers center the body of the flat fish between the filleting knives 90 such that the filleting knives cut along the opposing sides of the bones 150 of the flat fish as best seen in FIG. 6. The pairs of the centering fingers 40 move in and out in opposite directions as the flat fish moves downward in order to center the flat fish. The centering fingers 40 illustrated are commonly used in prior art filleting machines, such as the Baader 175 filleting machine and may be commercially purchased.

As the flat fish nears the bottom of the centering fingers 40, it is engaged by the spikes 44 on the feed gears 42 that extend through the lower portion of the centering fingers 40 as best seen in FIGS. 1 and 3. The feed gears 42 move rotationally in opposite directions as shown by arrows 41 in FIG. 4 to pull and then push the flat fish downwardly into the filleting knives 90. Each feed gear 42 includes a series of spikes 44 (FIG. 4) that extend outwardly from the periphery of the feed gears. In between each spike 44 is a bridge 46 that extends radially outwardly from the periphery of the feed gear 42. The center portion of each bridge 46 includes a groove 48 that allows the spikes 44 on the opposing feed gear to extend partially into the groove 48, thus allowing the feed gears 42 to move closer together.

Each feed gear 42 is rotatably mounted upon a shaft 50 (FIG. 4) that is driven by a drive pulley 52 (FIG. 2) through a chain belt 60 that is attached to a worn gear assembly 62. The shafts 50 and thus drive gears 42 are capable of moving inwardly and outwardly toward and away from each other as shown by arrows 54 (FIGS. 4 and 2) and are biased inwardly by a spring mechanism (not shown). The ability of the feed gears 42 to move inwardly and outwardly with respect to each other allows the feed gears to engage and move flat fish of differing thicknesses downwardly into the filleting knives 90 without squashing or otherwise damaging the meat of the flat fish.

As the fish 130 moves downwardly into contact with the filleting knives 90, after it has been centered thicknesswise by the fingers 40, it is centered widthwise by opposing centering plates 98 as best seen in FIGS. 1 and 6. A centering plate 98 is mounted adjacent the exterior surface of each filleting knife 90 such that the inner edge of each centering plate 98 extends inwardly slightly past the beveled cutting edge 99 (FIG. 6) of each filleting knife 90. Each centering plate 98 includes an upper beveled edge 100 (FIG. 1) that is beveled toward the surface of the filleting knife 90 so that the edge 100 contacts the fillets as they are cut from the bones 150 and directs the cut portion of the fillet away from the cutting edge 99 of the filleting knives 90 as shown in FIG. 6.

Each centering plate 98 also includes a centering edge 102 that extends downwardly parallel to the centering edge 102 on the opposing centering plate and tangential to the edge of the cutting knife 90 as best seen in FIG. 1. The centering edge 102 is beveled toward the surface of the filleting knife 90 and the outer edge contacts and follows the backbone 152 of the flat fish as it moves downwardly through the filleting knives. The centering plates 98, thus maintain the backbone 152 of the flat fish centered between the filleting knives 90 as shown in FIG. 6 thus helping to ensure that the filleting knives properly fillet the flat fish.

Figure 5:
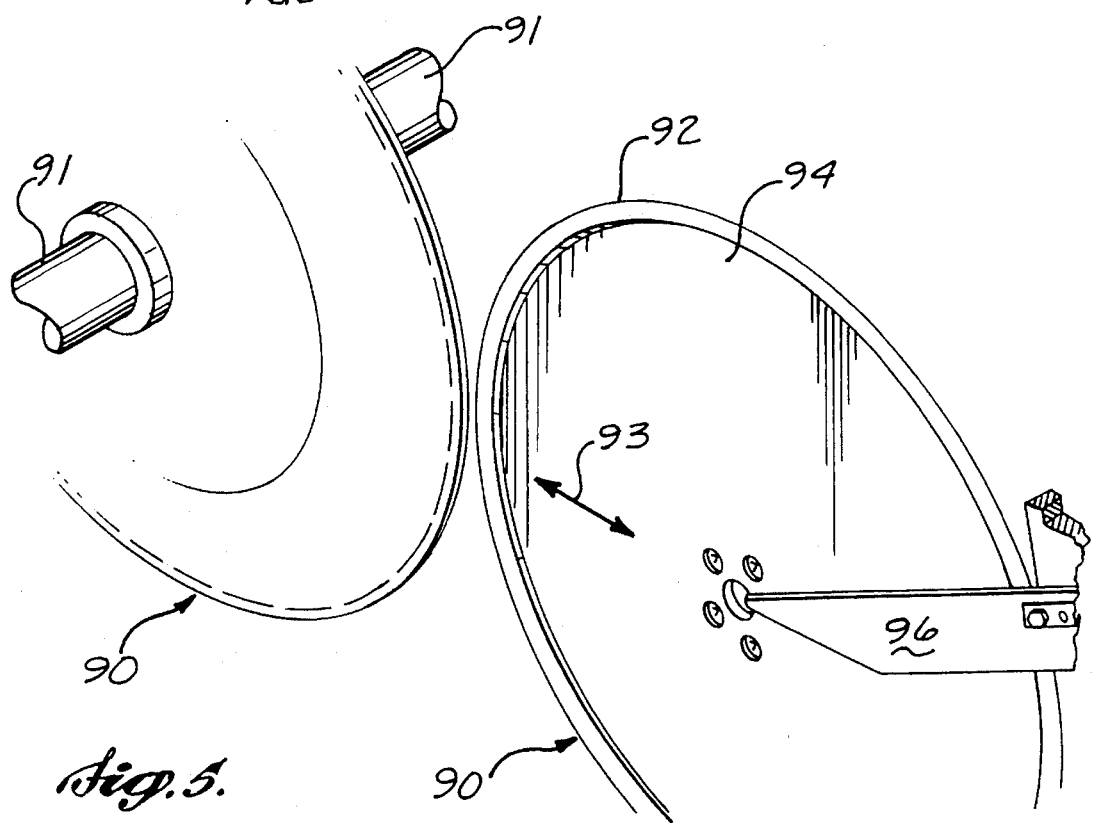
FIG. 5 is an enlarged perspective view of two of the filleting knives of the filleting machine of FIG. 1.

Each filleting knife 90 includes a beveled cutting edge 99 and an interior recessed portion 94 as best seen in FIG. 5. In FIG. 5, one pair of the filleting knives 90 has been removed in order to show a single opposing pair of the filleting knives 90. The interior surface of each filleting knife 90 includes the recessed portion 94. The recessed portion 94 allows for a gap in between the interior of the filleting knives that is greater than the thickness of the bones 150 of the fish, thus helping to ensure that the bones do not get caught or jam between the pairs of filleting knives 90. A scraping blade 96 extends between each pair of filleting knives 90 and radially inwardly toward the center of the filleting knives to remove any fish debris remaining between the pair of filleting knives.

Each filleting knife is rotatably mounted on a shall that turns at a high RPM. The right-hand pair of filleting knives 90 (FIGS. 1 and 6) are rotatably mounted on shafts 91 that are free to move in unison inwardly or outwardly in relation to the left-hand pair of filleting knives as shown by arrows 93. The inward and outward movement of the right-hand pair of filleting knives 90 allows the filleting knives to follow the width of the backbone of the flat fish as it moves between the centering plates 98. The centering edge 102 of the right-hand centering plates 98 contact and follow the right-hand edge of the backbone 152 and are attached to the right-hand pair of filleting knives 90 to move them inwardly or outwardly with respect to the opposite pair of filleting knives, in response to the width of the backbone. The filleting knives 90 cut the flat fish 130 along both sides of the bones 150 from the periphery of the flat fish approximately to the intersection between the bones 150 and the backbone 152 (FIG. 6).

As the flat fish 130 moves downwardly through the filleting knives 90, it is engaged by the spikes 68 on the opposing bottom belts 70 (FIG. 3). Each bottom belt 70 is rotatably mounted around an upper pulley 72 and a lower pulley 74 that is spaced vertically downwardly from the upper pulley 72. The upper pulley 72 of each bottom belt is in turn rotatably mounted upon a shall that is connected to a drive pulley 76 (FIGS. 1 and 2). Each drive pulley 76 is driven by a drive belt 80 that is in turn driven by the same worn gear assembly 62 that drives the feed gears 42 as best seen in FIGS. 1 and 2. The bottom belts 70 rotate in opposite directions as shown by arrows 69 (FIG. 3) in order to move the flat fish downwardly. The bottom belts 70 move inwardly and outwardly toward and away from each other as shown by arrows 82 (FIG. 3) and are spring biased toward each other. The inward and outward movement of the bottom belts allows the bottom belts to engage and move flat fish of varying thicknesses downwardly without damaging the meat of the flat fish.

Figure 7:
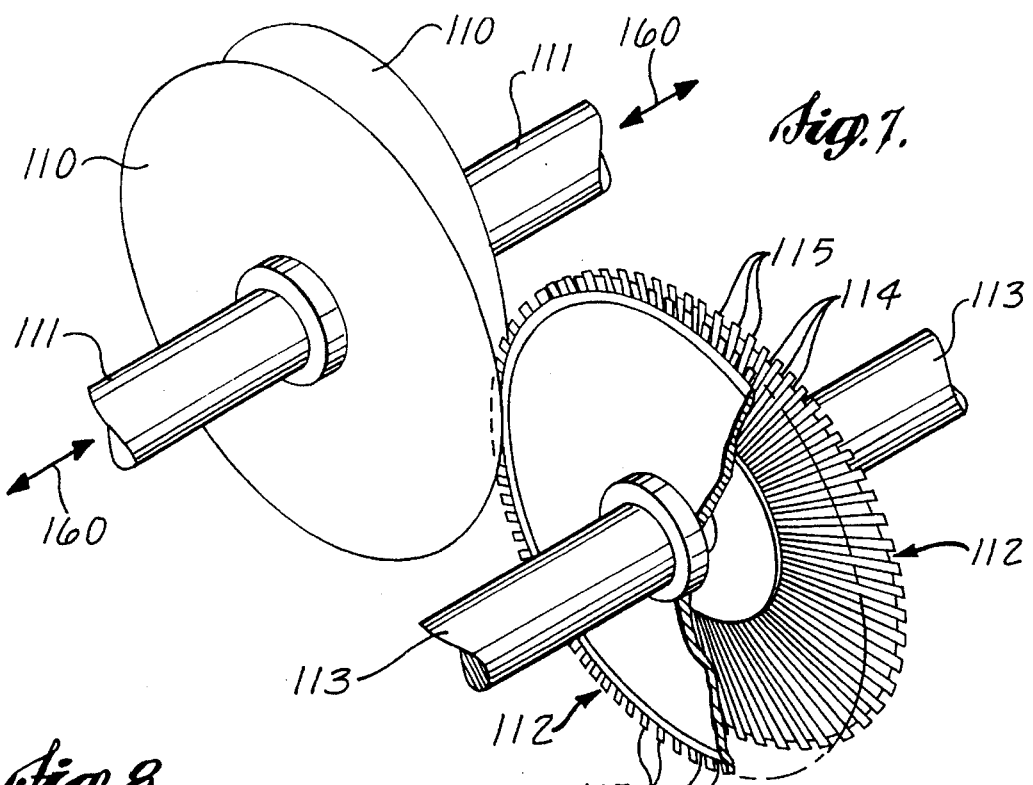
FIG. 7 is an enlarged perspective, partial cutaway view of the cutting and drive knives of the filleting machine of FIG. 1.
Figure 8:
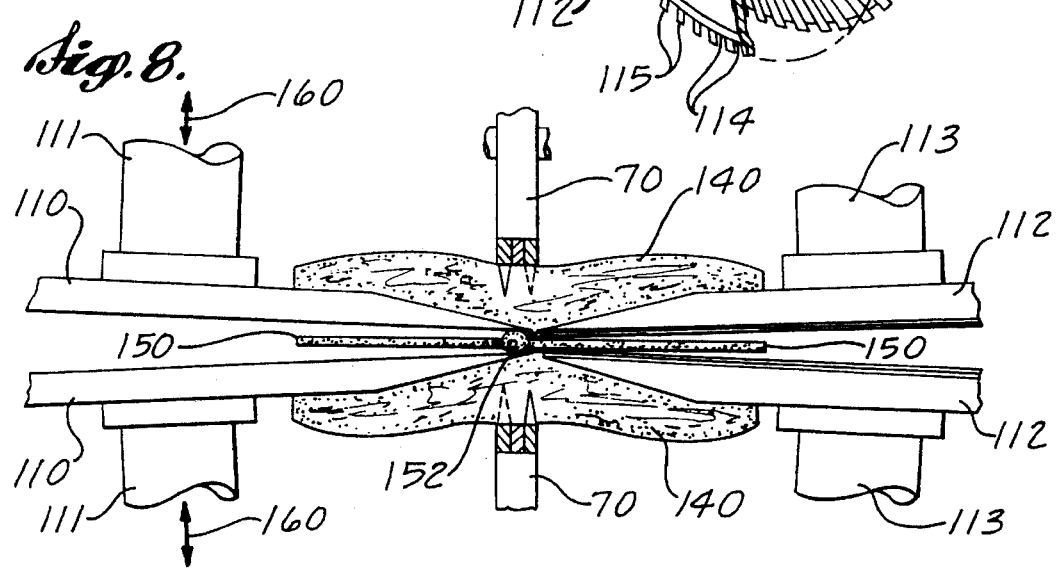
FIG. 8 is a partial cutaway top view of the cutting and drive knives and bottom drive belts of the filleting machine as a flat fish is filleted.
Figure 9:
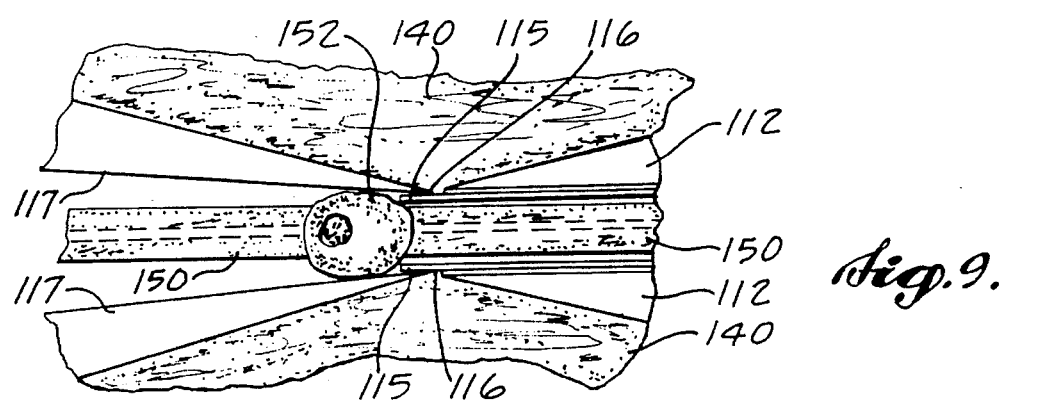
FIG. 9 is an enlarged cross-sectional view of the cutting and drive knives showing the interaction between the cutting knives and the bones and backbone of a flat fish as it is filleted.

After the flat fish moves through the filleting knives 90, the bottom belts 70 move the partially filleted flat fish into contact with deboning knives comprising a pair of drive knives 112 and cutting knives 110 as best seen in FIGS. 7–9. The drive knives 112 include a series of teeth 115 located around the circumference of each drive knife. The teeth 115 are separated from each other by slots 114. Each tooth 115 is thinner than the rest of the drive knife 112 such that a ledge or shoulder 116 (FIG. 9) is formed between each tooth 115 and the drive knife 112. Each corresponding cutting knife 110 extends into the ledge 116 formed on the drive knife 112 in an interlocking relationship as best seen in FIG. 9.

Each drive knife 112 and cutting knife 110 is mounted at an angle with respect to the opposite drive knife or cutting knife such that the inner edges of the knives that contact and cut the flat fish are closer together than the outer edges of the cutting knives or drive knives (FIGS. 8 and 9). Each drive knife 112 is rotatably mounted upon a shaft 113 and each cutting knife 110 is rotatably mounted on a shaft 111. As best seen in FIGS. 8 and 9, the tips of the teeth 115 on the drive knives 112 contact and engage the backbone 152. The engagement between the teeth 115 and backbone 152 grabs and moves the backbone 152 downwardly through the cutting knives 110. The inner edge 117 of each cutting knife 110 rides along the exterior of the backbone 152 cutting the remaining portion of the flat fish fillets 140 away from the backbone 152.

The lower cutting knife 110 as shown in FIG. 8 is mounted upon a drive shaft 111 that moves inwardly and outwardly with respect to the opposite cutting knife 110 as shown by arrow 160. The ability of one of the drive knives 110 to move inwardly and outwardly with respect to the opposite drive knife 110 allows the inner edge 117 of the knife to move inwardly and outwardly, thus allowing the knife to follow the changing thickness of the backbone 152 thus ensuring that the maximum amount of meat is maintained on the fillets 40 without leaving portions of the backbone in the fillets. The lower cutting knife 110 (FIG. 8) is biased inwardly toward the backbone 152 by a biasing spring (not shown) that maintains the inner edge 117 of the cutting knife 110 adjacent the lower surface of the backbone 152.

As the flat fish 130 moves through the flat fish filleting machine 10, it is constantly pushed and/or pulled downwardly through the filleting knives and deboning knives by moving between the lower feedbelt 26, the drive gears 42, the bottom belts 70, and the drive knives 112 to ensure that the flat fish 130 is positively fed through the filleting machine. The speed at which the flat fish 130 may be fed through the filleting machine is a function of the speed of the means for moving the fish through the filleting machine 10, i.e., the speed that the lower feedbelt 26, feed gears 42, bottom belt 70, and drive knives 112 feed the flat fish along and the speed at which the filleting knives 90 and cutting knives 110 are capable of filleting the flat fish without jamming.

The present invention allows flat fish to be processed through that filleting machine at much higher speeds than prior art filleting machines are capable of.

The present invention's use of interlocking and cooperating drive knives 112 and cutting knives 110 that follow the thickness of the backbone 152, fillets the flat fish in a manner that removes substantially all of the bones 150 and backbone 152 while leaving a greater portion of the usable meat on the resulting fillets.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A machine for cutting the body of a flat fish into fillets, the machine comprising:
    (a) first and second pairs of circular rotating fillet knives positioned in an opposing parallel relationship to cut along opposing surfaces of a flat fish's bones;
    (b) a pair of circular cutting knives positioned downstream from the fillet knives along a processing path to cut along the backbone of the flat fish, at least one of the cutting knives moving in and out with respect to the backbone approximately normal to a plane defined by the flat fish's bones, and a plane defined by said first and second pairs of fillet knives, following thickness variations of the backbone while cutting; and
    (c) a pair of circular drive knives positioned downstream from the fillet knives on a processing path to engage the backbone of the flat fish to help move the flat fish along the processing path, the drive knives being positioned in an opposing relationship to the cutting knives.

2. The machine of claim 1, wherein the drive knives include a plurality of teeth and wherein the cutting edges of the cutting knives engage and intermesh with the sides of the teeth while cutting to remove individual fillets from the backbones of the flat fish.

3. The machine of claim 1, further comprising moving means for positively engaging both sides of the flat fish and for moving the flat fish continuously through the fillet knives, drive knives, and cutting knives along the processing path, the moving means being positioned to extend through a gap formed between the opposing first and second pairs of fillet knives and a gap between the opposing cutting knives and drive knives to continuously positively engage and move the flat fish over a length of the processing path.

4. The machine of claim 3, wherein the moving means includes one or more rotating belts located on opposite sides of the fillet knives and cutting knives, each belt including spikes that penetrate and engage the sides of the flat fish in order to move the flat fish along the processing path.

5. A method for filleting the body of a flat fish comprising:
    (a) cutting along both sides of the bones of the flat fish with first and second pairs of circular, rotating fillet knives positioned in an opposing parallel relationship to cut along opposing surfaces of the bones;
    (b) cutting the fillets away from a backbone of the flat fish using a pair of circular cutting knives positioned in an opposing relationship with a pair of circular drive knives located downstream along a processing path from the filleting knives, at least one of the cutting knives moving in and out with respect to the backbone of the flat fish approximately normal a plane defined by the flat fish's bones and a plane defined by said first and second pairs of fillet knives, following thickness variations in the backbone of the flat fish while cutting; and
    (c) engaging the backbone of the flat fish with a pair of circular drive knives positioned downstream from the fillet knives on a processing path to help move the flat fish along the processing path, the drive knives being positioned in an opposing parallel relationship to the cutting knives.

6. The method of claim 5 further comprising positively engaging both sides of the flat fish with moving means for engaging the sides of the flat fish and for moving the flat fish continuously through the filleting knives, drive knives, and cutting knives along the length of the processing path.

7. The method of claim 6, wherein the moving step further comprises contacting and penetrating both sides of the flat fish with rotating belts having spikes that extend into the sides of the flat fish, the rotating belts moving in and out with respect to the fillet knives and cutting knives in response to variations in thickness of the flat fish.

* * * * *